United States Patent
Stevenson, III

(10) Patent No.: US 7,685,765 B2
(45) Date of Patent: Mar. 30, 2010

(54) DEVICE FOR SUPPORTING PLANTS AND RELATED METHOD

(76) Inventor: William W. Stevenson, III, 61313 Idlewood Rd., Wilmington, DE (US) 19805

( * ) Notice: Subject to any disclaimer, the term of this patent is extended or adjusted under 35 U.S.C. 154(b) by 191 days.

(21) Appl. No.: 11/390,462

(22) Filed: Mar. 28, 2006

(65) Prior Publication Data

US 2006/0283082 A1 Dec. 21, 2006

Related U.S. Application Data

(60) Provisional application No. 60/665,394, filed on Mar. 28, 2005, provisional application No. 60/672,099, filed on Apr. 18, 2005, provisional application No. 60/677,344, filed on May 4, 2005.

(51) Int. Cl.
*A01G 9/12* (2006.01)
(52) U.S. Cl. ............................................. 47/47; 47/70
(58) Field of Classification Search ............ 47/47, 47/65.5, 65.6, 66.3, 66.4, 44, 42, 43, 65, 47/70, 71; *A01G 9/12, 17/10, 17/04*
See application file for complete search history.

(56) References Cited

U.S. PATENT DOCUMENTS

| | | | | |
|---|---|---|---|---|
| 4,092,804 A | * | 6/1978 | Morris et al. | 47/71 |
| 4,173,098 A | * | 11/1979 | Smith | 47/80 |
| 4,299,055 A | * | 11/1981 | Dziewulski et al. | 47/71 |
| D276,511 S | * | 11/1984 | Kole et al. | D11/164 |
| 4,962,614 A | * | 10/1990 | Koerper | 47/66.1 |
| 5,042,197 A | * | 8/1991 | Pope | 47/79 |
| 5,309,670 A | * | 5/1994 | Bates | 47/71 |
| D348,858 S | * | 7/1994 | Nuosce | D11/148 |
| 5,327,678 A | * | 7/1994 | Schweiker | 47/70 |
| D352,479 S | * | 11/1994 | Carlson | D11/153 |
| 5,402,602 A | * | 4/1995 | Huang | 47/78 |
| 5,501,038 A | * | 3/1996 | Gregoranto | 47/70 |
| 6,125,579 A | * | 10/2000 | Pavelka | 47/79 |
| 6,131,334 A | * | 10/2000 | Fan | 47/81 |
| 6,209,258 B1 | * | 4/2001 | Schneider | 47/46 |
| D460,717 S | * | 7/2002 | Fan | D11/152 |
| D488,402 S | * | 4/2004 | Fan | D11/164 |
| D541,551 S | * | 5/2007 | Stevenson, III | D6/403 |
| 2005/0102894 A1 | * | 5/2005 | Jocelyn | 47/47 |

FOREIGN PATENT DOCUMENTS

GB 2220118 A * 1/1990
GB 2280583 A * 2/1995

* cited by examiner

*Primary Examiner*—Rob Swiatek
*Assistant Examiner*—Kristen C Hayes
(74) *Attorney, Agent, or Firm*—Edell, Shapiro & Finnan LLC

(57) ABSTRACT

A plant support device includes a base that connects to a supporting post. The base may comprise a plate including a series of receptacles that connect to the supporting post and position the post in a generally vertical orientation. The receptacles may be formed as cups extending from the base, or as recesses formed into the base. The base may be releasably connected to the floor of a container such as a flowerpot or planter. The base may further include spacers capable of creating an aeration gap within the container. The base may also include slots that limit the rotation of the base when positioned within the container. The supporting post may be formed from a series of axially connectable pole sections.

14 Claims, 15 Drawing Sheets

DEVICE FOR SUPPORTING PLANTS AND RELATED METHOD

CROSS REFERENCE TO RELATED APPLICATIONS

This application claims priority to U.S. Provisional Application No. 60/665,394, filed 28 Mar. 2005 and entitled "Improved Apparatus and Method for Supporting Potted Flowers and Plants"; U.S. Provisional Application No. 60/672,099, filed 18 Apr. 2005 and entitled "Improved Apparatus and Method for Supporting Potted Flowers and Plants"; and U.S. Provisional Application No. 60/677,344 filed 4 May 2005 and entitled "Apparatus and Method for Supporting Potted Flowers and Plants", the disclosures of which are incorporated herein by reference in their entireties.

FIELD OF THE INVENTION

The present invention relates generally to a support device for potted vegetation and, in particular, to a device operable to facilitate potting of plants and flowers.

BACKGROUND

It is a common practice of owners of potted plants, in order to support vertically extending vines and stems, to force a support stick or rod into the potting soil adjacent the vine or stem and then tie the support stick to the vine or stem. Forcing the stick into the potting soil often results in accidental rupturing of the plant roots or blocking drain holes in the pot, either of which can be fatal to the plant.

Several attempts have been made to address these issues. For example, U.S. Pat. No. 4,020,592 (Saunders) discloses an extendable, rod-like plant support that projects downward through a central hole in a plant pot and fits into a receptacle defined in a specially provided reservoir dish onto which the planter is placed. This arrangement has limited use for a number of reasons, not the least of which is that it functions only as part of a specially constructed pot having a central drain hole, and the position of the support rod is limited to the center of the pot.

U.S. Pat. No. 5,327,678 (Schweiker) shows a separate circular plate that can be selectively disposed in the bottom of any planter pot and is provided with a permanently attached upward projection adapted to receive a plant support rod. The plate is retained in position in the pot by the weight of the potting soil. This arrangement also suffers from providing for only one permissible position of the support rod, a limitation which limits the type and growth of plants with which the arrangement can be used. Moreover, relying on the weight of the soil to keep the plate in place does not protect against the entire unit falling out of the pot should the pot be tipped over on its side.

U.S. Pat. No. 2,058,934 (Yohe) describes a plant receptacle including a false bottom and one or more handles attached to the bottom. This structure suffers from several disadvantages. To repot the plant, a user must remove the false bottom from the receptacle and physically separate the plant from the bottom. Such a forcible separation damages the plant's root structure. In addition, handles are provided to permit a user to remove the false bottom from the receptacle, That is, a pair of handles is fixed to the false bottom; alternatively, a single handle is removably connected to the false bottom proximate its center. These configurations limit the type and growth of plants with which the receptacle can be used. The structure, moreover, relies on the weight of the soil to keep the false bottom in place; consequently, the false bottom is prone to falling out of the receptacle should the receptacle be tipped over on its side.

The present invention addresses these and further issues, while avoiding harm to plants that might occur during potting or transfer, as well as in a situation where the container tips over. The invention provides a plant supporting post with positional and length adjustability, as well as provides a base adapted to mate with containers (e.g., flowerpots and/or planters) of various dimensions and having various configurations. Specifically, it is a feature of the present invention to provide a base and supporting post arrangement wherein a plurality of receptacles is provided in the base to accommodate the supporting post in a respective plurality of transverse positions. In addition, instead of a single supporting post holding up a plant, flower, or other item placed into the container, the present invention permits multiple supporting posts to be utilized. The supporting post may be formed from interconnecting sections to support plant or flowers of virtually any height.

SUMMARY

Accordingly, the present invention is directed toward a support device or apparatus for supporting a plant or flower in a container such as a flowerpot or planter. The device includes a base configured to selectively receive one or more supporting posts. The base may comprise a plate including a plurality of receptacles operable to couple to the supporting post and position the post in a generally vertical orientation. The receptacles may be formed as cups extending from the base, or as recesses formed into the base. The base may further include spacers adapted to create an aeration gap within the container. The base, furthermore, may include slots configured to limit the rotation of the base when positioned in the container, as well as spring clips adapted to secure the base to the container. The supporting post may be formed from a plurality of axially connectable rod sections.

BRIEF DESCRIPTION OF THE DRAWINGS

Like reference numerals have been used to identify like elements throughout this disclosure.

DETAILED DESCRIPTION

Figure 1A:
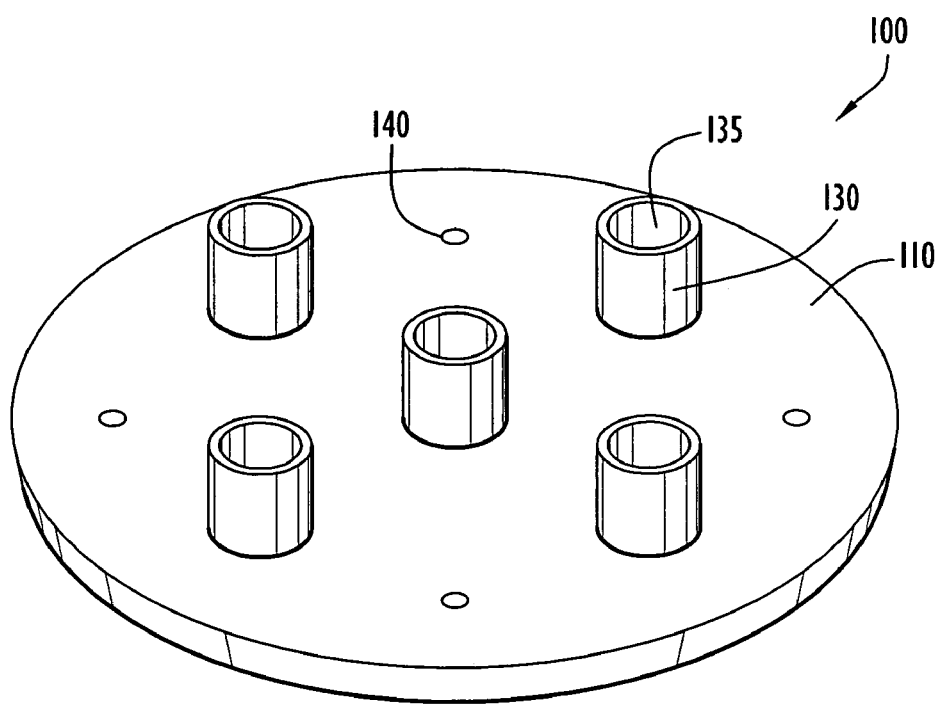
FIG. 1A illustrates a top perspective view of a plant supporting device according to an embodiment of the invention.
Figure 1B:
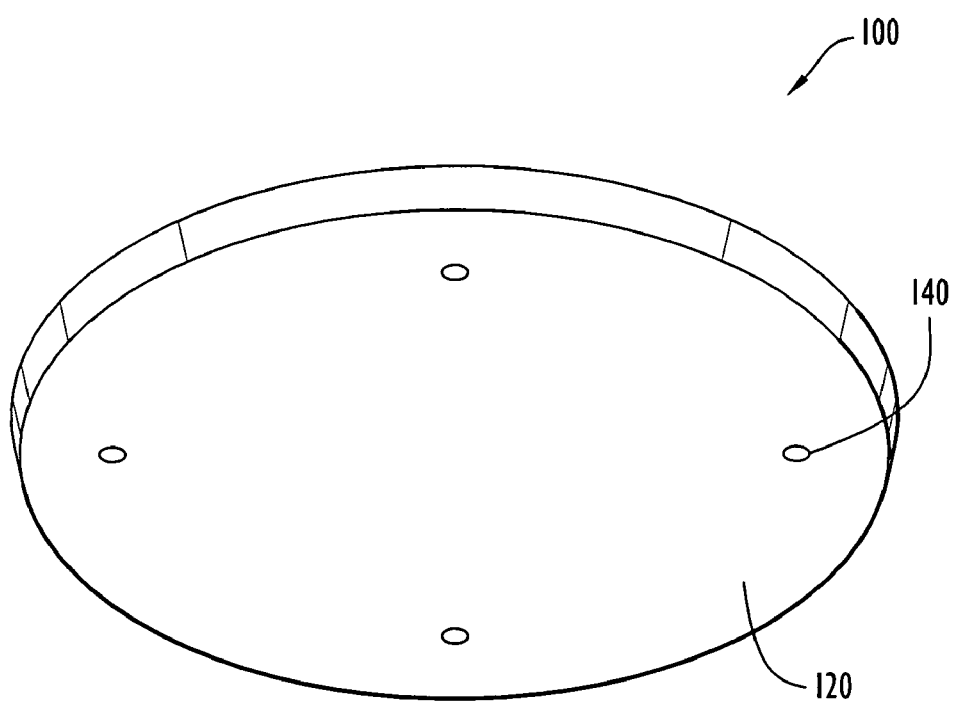
FIG. 1B illustrates a bottom perspective view of the plant supporting device of FIG. 1A.

The supporting device for a plant or flower according to the present invention is illustrated in FIGS. 1 and 2. Generally, the supporting device may include a base member configured to removably couple to a supporting post at selected locations such that the supporting post is positioned in a generally vertical orientation. Referring to FIGS. 1A and 1B, the base 100 may take the form of a plate having a first or top surface 110 and a second or bottom surface 120. The base 100 typically includes dimensions enabling its insertion into a container 300 (FIG. 3) such as a flowerpot or planter, as described below. For example, the circumference of the base 100 may be slightly smaller than the channel defined by the container side wall. With this configuration, the transverse movement of the base 100 within the container (FIG. 3) is prevented, stabilizing the base 100 therein. The shape of the base 100 is not particularly limited, although the base is preferably contoured to complement the contour of the container 300. By way of specific example, when the container 300 comprises a generally circular flowerpot, the base 100 may be formed into a generally circular disc. The material forming the base 100 may include, but is not limited to, wood, metal, and plastic. By way of specific example, the base 100 may be formed from a single piece of plastic material. One or more apertures 140 may also be formed into the base 100 to permit the passage of fluid (e.g., liquid, air, etc.) from the top surface 110 of the base 100 to the bottom surface 120 of the base, and vice versa (enabling drainage and aeration).

Figure 10:
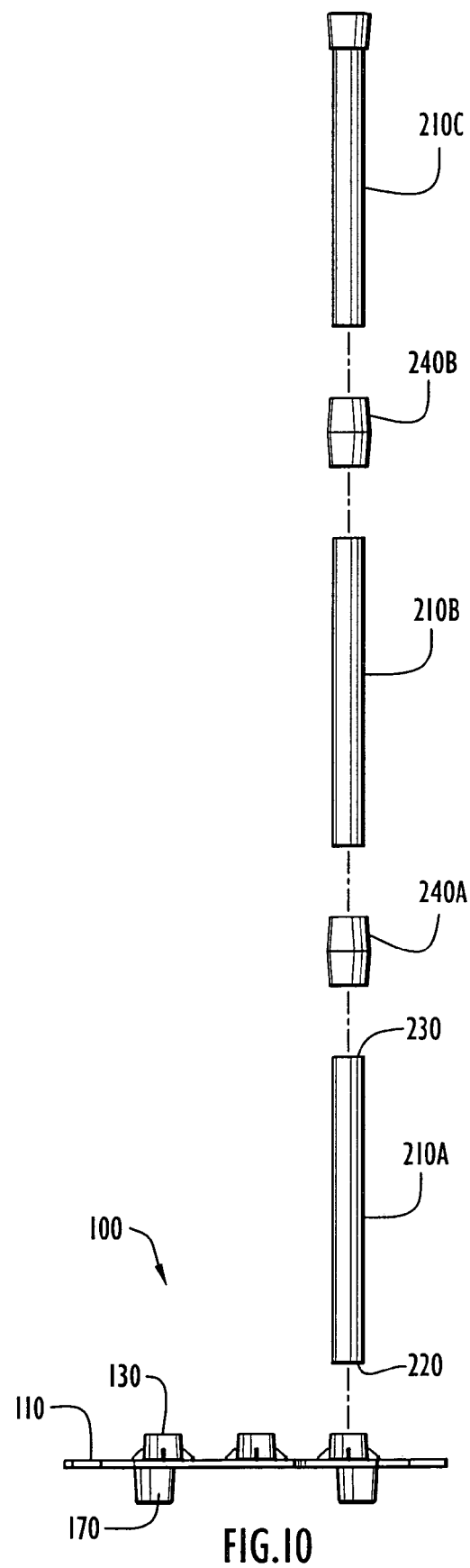
FIGS. 10 and 11 illustrates side views of the plant supporting device of FIGS. 9A and 9B, further including a reconfigurable supporting post.

The base 100 may further include one or more receptacles operable to receive the supporting post 200 (FIG. 10). Referring to FIG. 1A, the receptacles may be formed as cups 130 extending upward from the top surface 110 of the base 100. Each upstanding cup 130 may be substantially cylindrical and may include a closed distal (lower) end and an open proximal (upper) end. A substantially cylindrical channel 135, extending from the cup closed distal end to the cup open proximal end, is defined within the cup 130. The channel 135 includes dimensions sufficient to receive the supporting post 200, as described below. The height of the cups 130 is not particularly limited. Similarly, the number and location of the cups 130 is not limited.

Figure 2A:
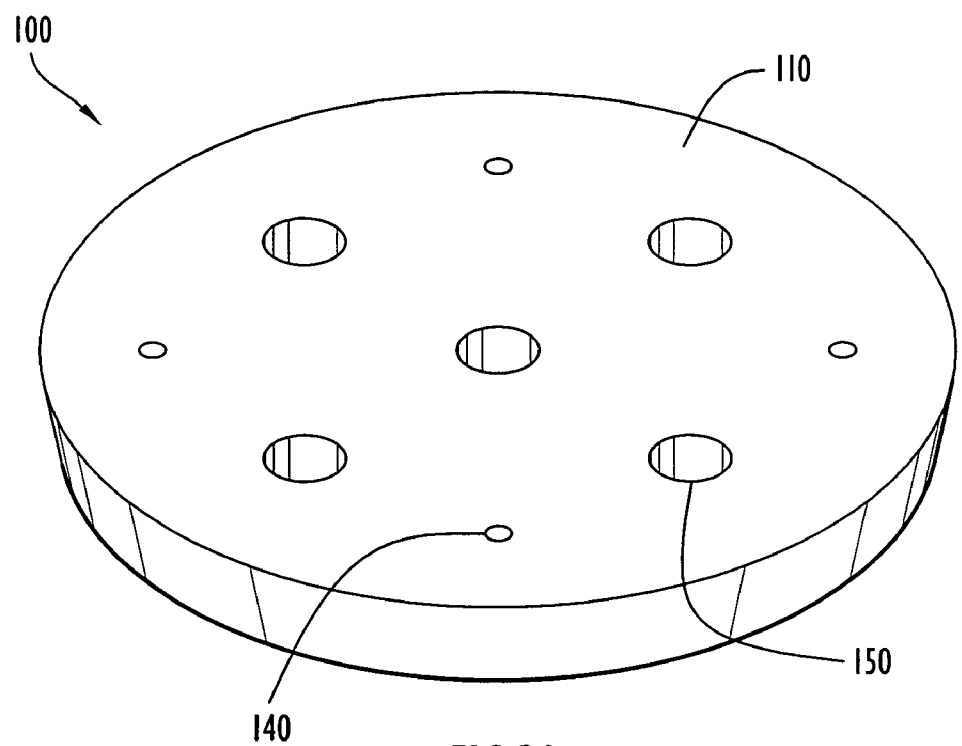
FIG. 2A illustrates a top perspective view of a plant supporting device according to another embodiment of the invention.
Figure 2B:
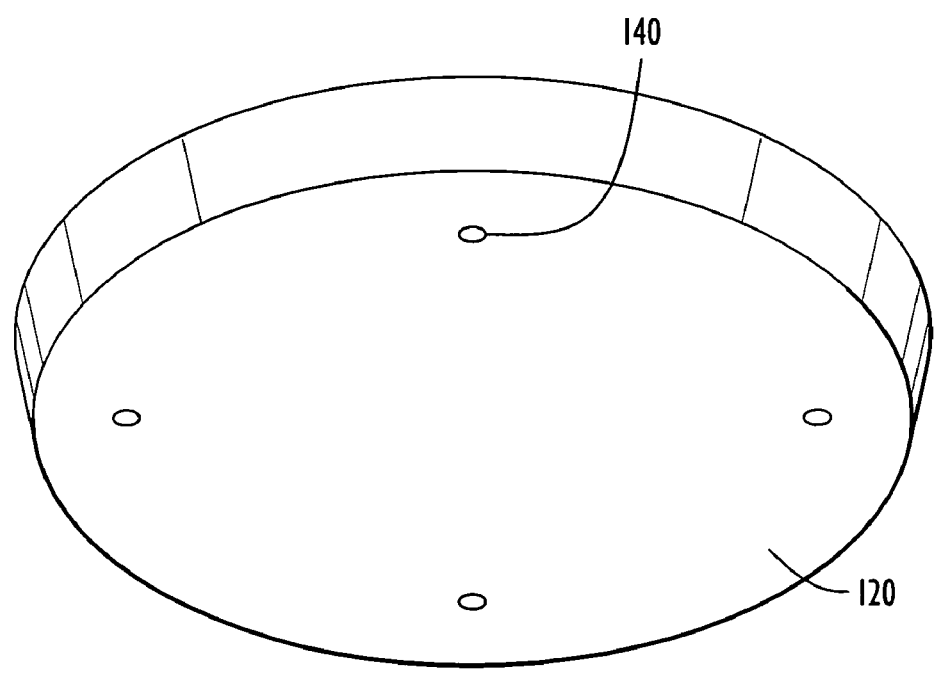
FIG. 2B illustrates a bottom perspective view of the plant supporting device of FIG. 2A.

Referring to FIGS. 2A and 2B, the receptacles may be formed as recesses 150 defined in the top surface 110 of the base 100. The recesses 150 may extend downward through most of the base thickness. The recesses 150 are dimensioned similar to the receptacles 130. Specifically, each recess 150 may be substantially cylindrical and include a closed distal (lower) end and an open proximal (upper) end. Each recess 150 forms a substantially cylindrical channel extending from the recess closed distal end to the recess open proximal end. The recess channel has dimensions sufficient to receive the supporting post 200.

Figure 3A:
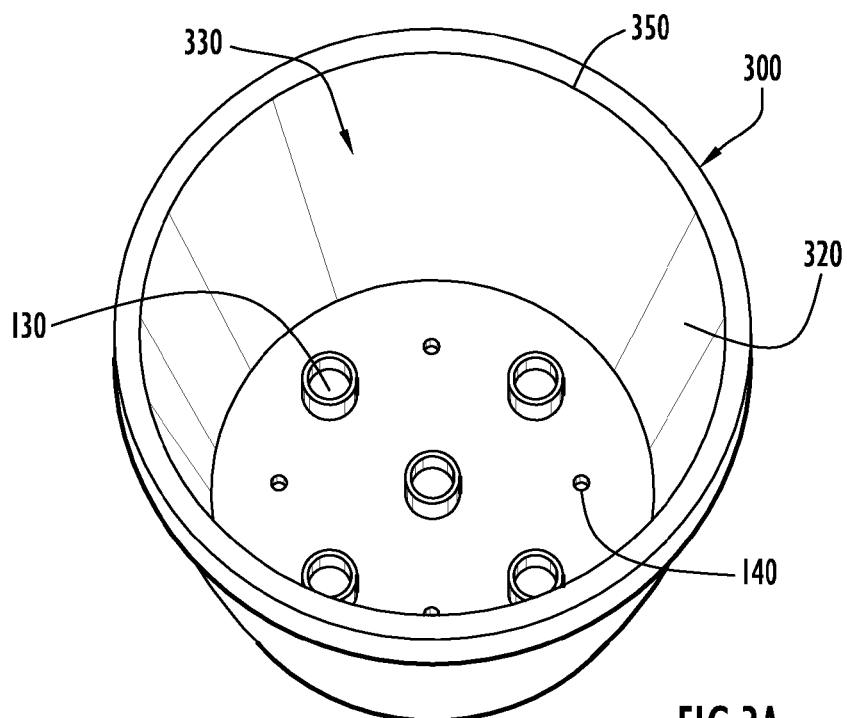
FIGS. 3A and 3B illustrate perspective views of a container including the plant supporting device of FIGS. 1A and 1B.
Figure 3B:
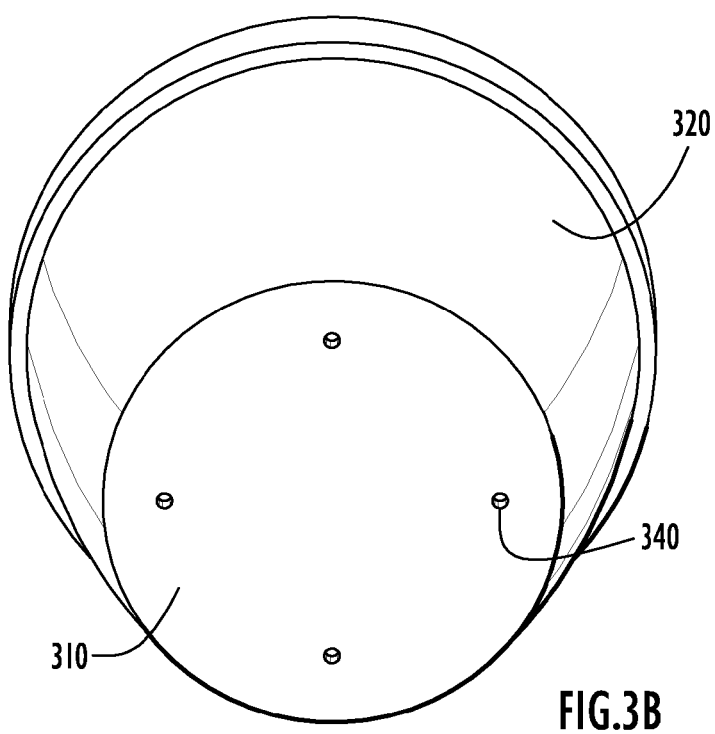
Figure 4A:
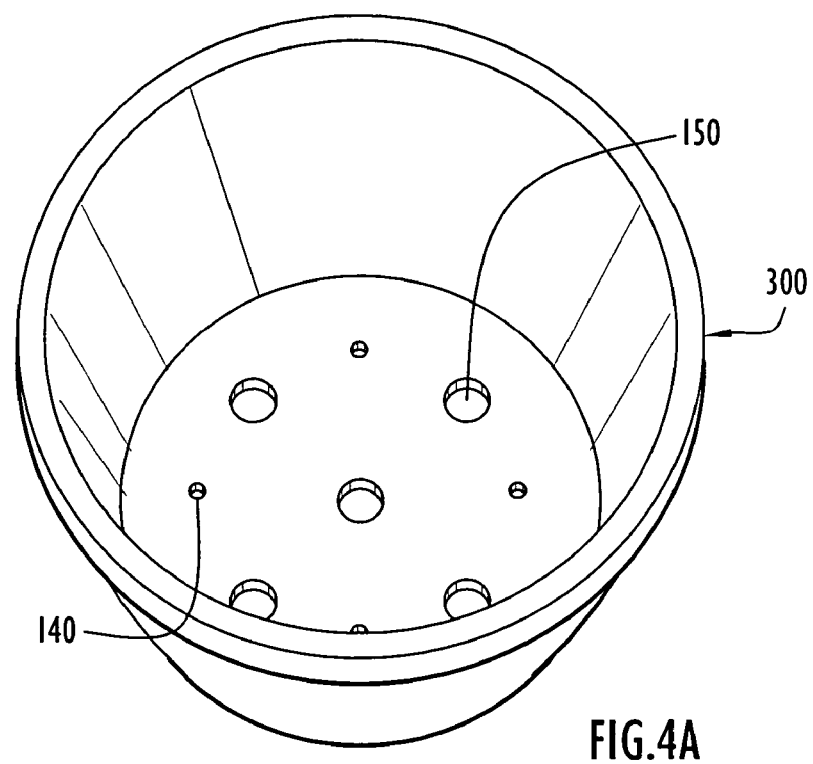
FIGS. 4A and 4B illustrate perspective views of a container including the plant supporting device of FIGS. 2A and 2B FIGS. 5A and 5B illustrate perspective views of the plant supporting device of FIGS. 1A and 1B, further including spacer members.
Figure 4B:
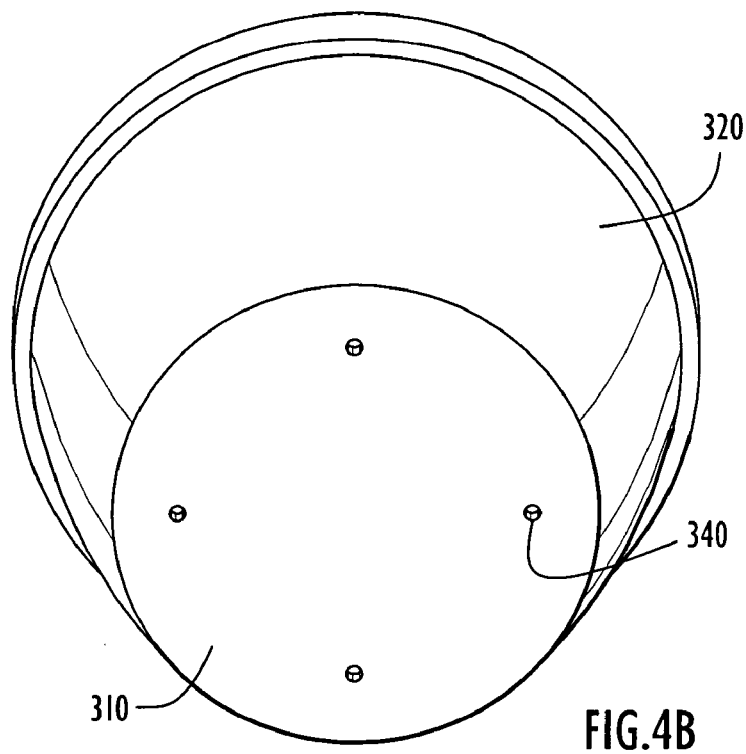

The container includes a structure operable to hold fill material typically used with vegetation (soil, fertilizer, etc.). Referring to FIGS. 3 and 4, a container 300 such as a flowerpot or planter typically includes an opened-top structure with a bottom wall or floor 310 and a side wall 320. The side wall 320 defines a channel 330 extending from the floor 310 to an opening 350. The container 300 may comprise any dimensions suitable for its described purpose, and may be made of any suitable materials. For example, the container 300 may include a generally frusto-conical shape with the side wall 320 tapering inward as it approaches the floor 310. It should be understood, however, that the container 300 may be formed into any shape. The container may also include drainage holes 340 at preselected locations along the floor 310. Drainage holes 340 permit excess water to drain from the container 300 into a reservoir onto which the container is placed when in use. Typically, eight such drainage holes are provided in conventional containers.

In operation, the base is aligned with the container opening 350, and is axially urged into the channel 330 of the container 300 such that the bottom surface of the base 100 rests on the floor 310 of the container. One or more supporting posts 200 may be inserted to the desired receptacle or receptacles. The container 300 may then be filled with potting soil and the vegetation planted. As the plant or flower grows, it may be selectively supported by the desired supporting post or posts. For example, as the plant grows, the flower or plant may be tethered to the supporting posts using straps (e.g., flexible material such as cotton, twine, etc), ties, plant tape, ribbons, tomato clips, etc.

Figure 5A:
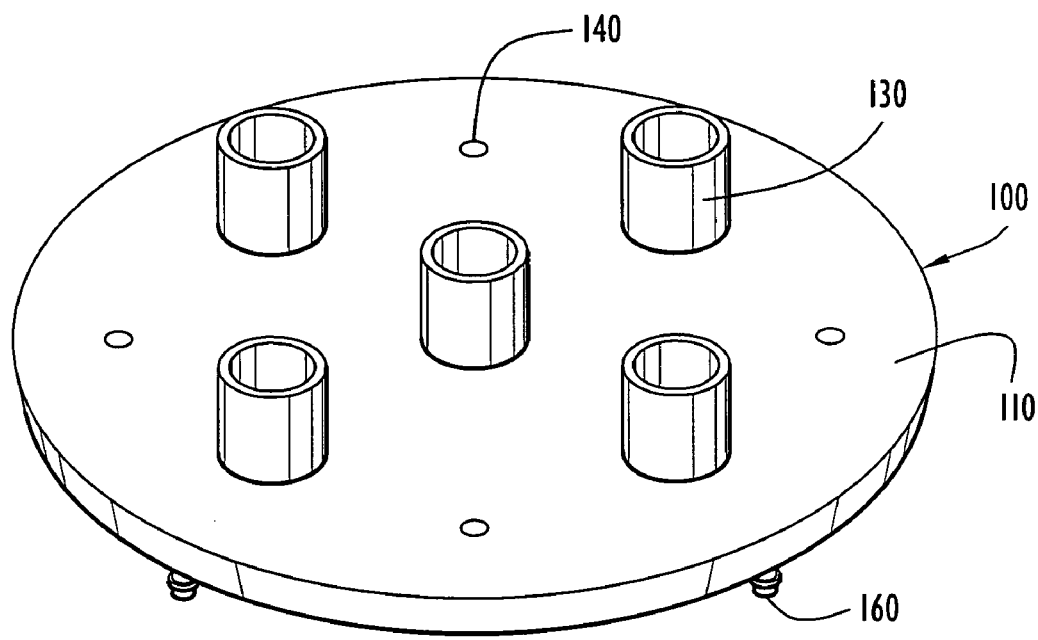
Figure 5B:
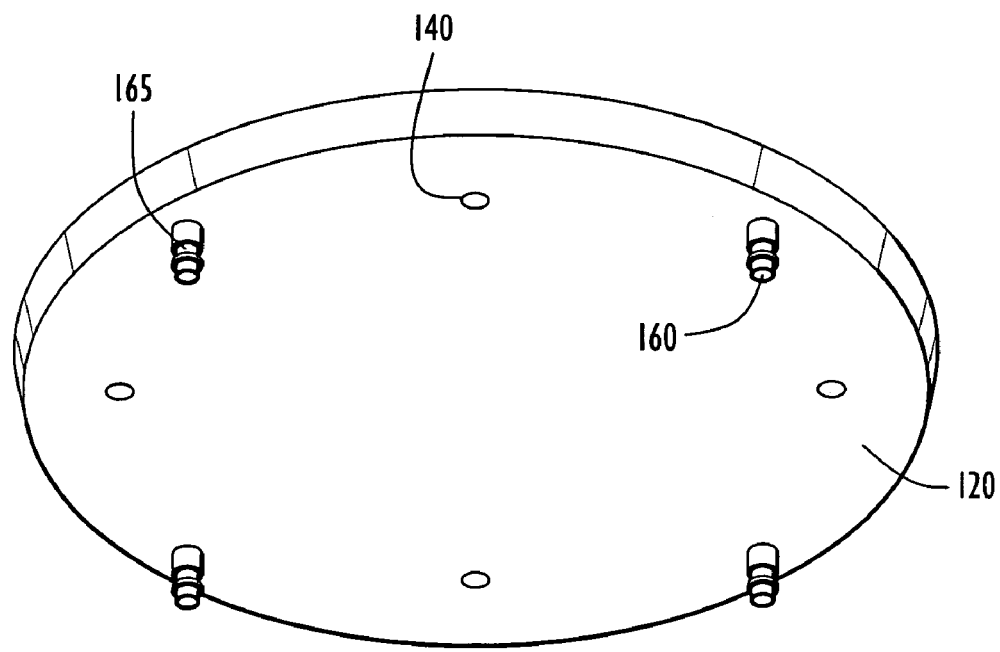
Figure 6A:
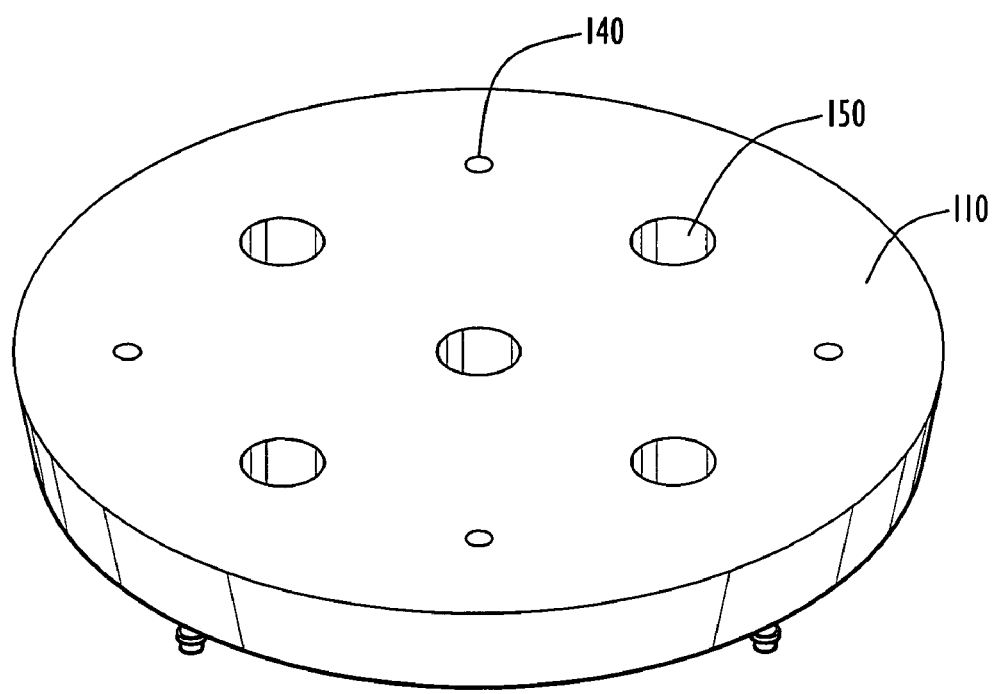
FIGS. 6A and 6B illustrate perspective views of the plant supporting device of FIGS. 2A and 2B, further including spacer members.
Figure 6B:
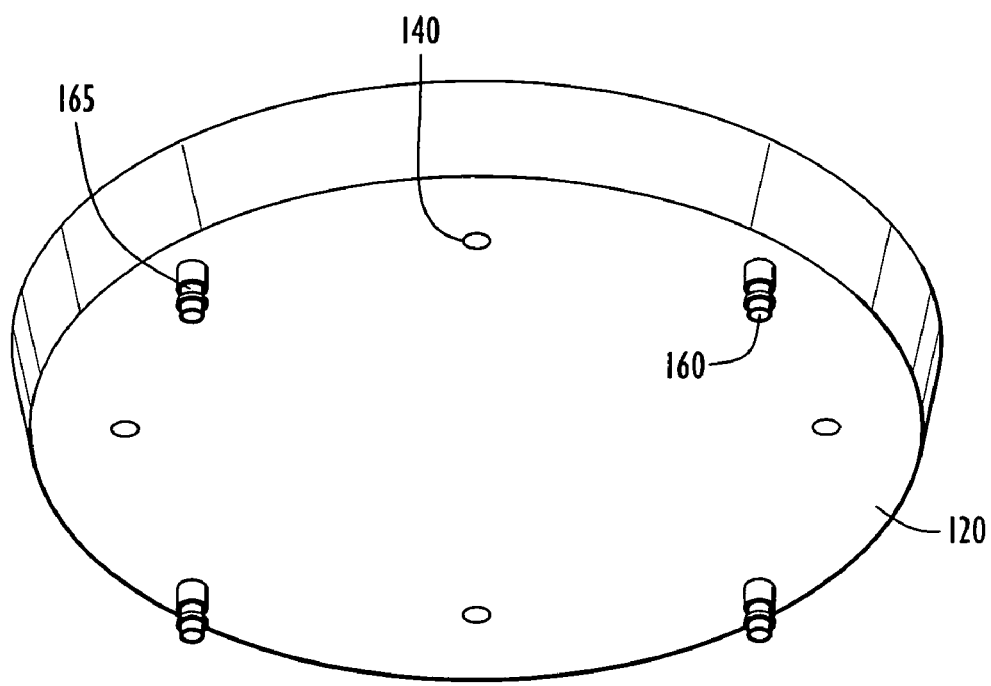

The bottom surface 120 of the base may be further modified to removably fasten to the floor 310 of the container 300. By way of example, the bottom surface 120 may include fasteners such as double sided tape, pressure sensitive adhesives, hook-and-loop fasteners, etc. Alternatively, screws may be inserted through the floor 310 to secure the base 100 to the container 300. The location and number of fasteners is not particularly limited. Securing the base 100 to the container 300 not only prevents inadvertent removal of the base (e.g., should the container tip over), but stabilizes the base to prevent its transverse movement within the container 300. This in turn, creates a more stable environment for root structure and plant growth. Another mechanism for releasably securing the base 100 to the container is illustrated in FIGS. 5 and 6. The base 100 includes a structure similar to that described above with reference to FIGS. 1 and 2, respectively, but further include connectors 160 depending from the bottom surface 120 of the base 100. The connectors 160 may include male connectors configured to snap-fit into the drainage holes 340 defined through the bottom wall 310 of the containers. Each connector 160 may be generally cylindrical and include an outer diameter equal to or slightly larger than the diameter of the drainage holes 340. The connector 160 may be resiliently compressible diametrically such that the connector can be forced through the drainage hole 340. An annular recess 165 is defined in the circumferential outer surface of each connector 160 to provide for a snap-fit engagement into the drainage hole 340. The number of connectors 160 provided is not particularly limited, and includes values equal to or less than the number of the drainage holes 340 in the container 300. For example, when the container 300 includes eight drainage holes 340, only four connectors are provided to maintain the container's drainage capability. Of course, more or fewer depending connectors 160 can be provided. Alternatively, if the container is made of plastic or other material that can be easily penetrated by the consumer, the consumer can add drainage holes 340 as needed. As illustrated in FIGS. 5 and 6, the base 100 includes four connectors 160 angularly spaced apart by approximately 90° m which each connector located proximate the outermost edge of the base.

As noted above, securing the base 100 to the container 300 using the connectors 160 not only prevents inadvertent removal of the base (e.g., should the container tip over), but stabilizes the base to prevent its transverse movement within the container. This in turn, creates a more stable environment for root structure and plant growth. In addition, since containers of various sizes typically include drainage holes 340 located in identical locations (i.e., the drainage holes are similarly located from container to container), the base 100 is conveniently adapted for use with containers of various sizes. Thus, the above and below described configurations provide a standard base 100 including depending connectors 160 operable for use with containers 300 of various sizes.

Figure 7A:
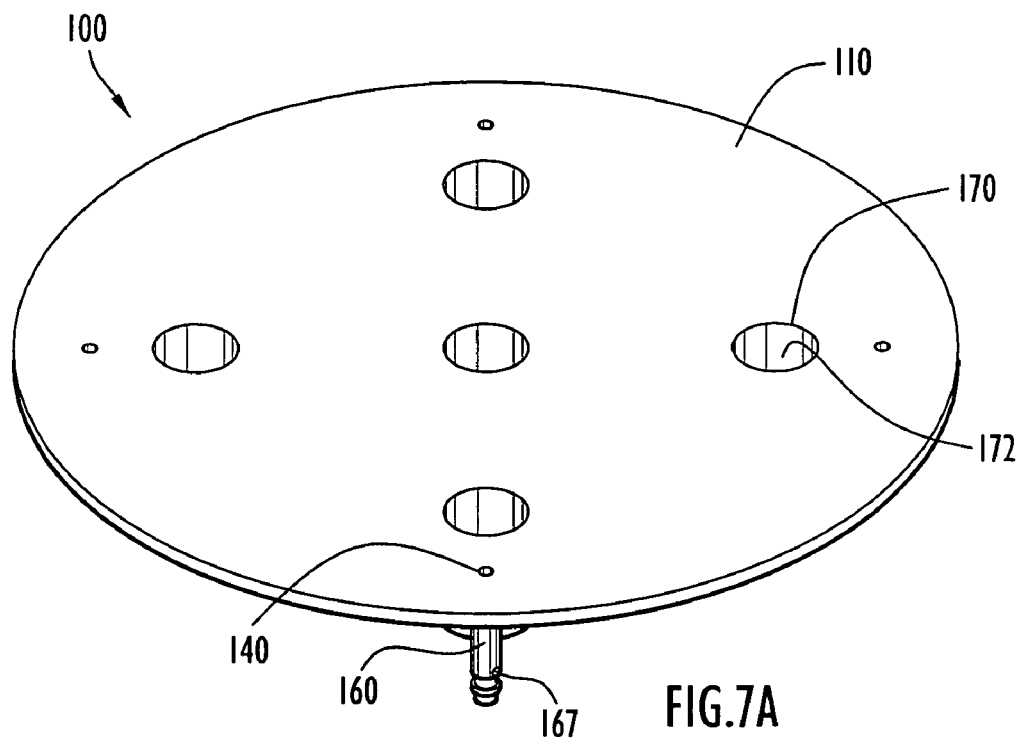
FIGS. 7A and 7B illustrate top and bottom perspective views, respectively, of a plant supporting device according to another embodiment of the invention.
Figure 7B:
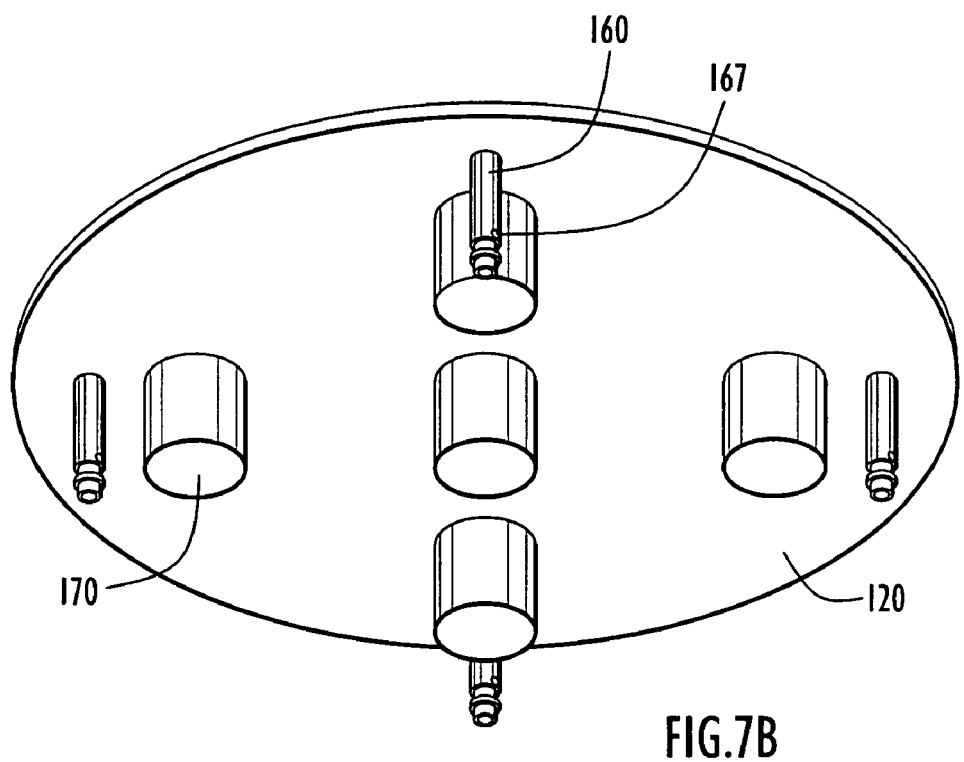
Figure 8:
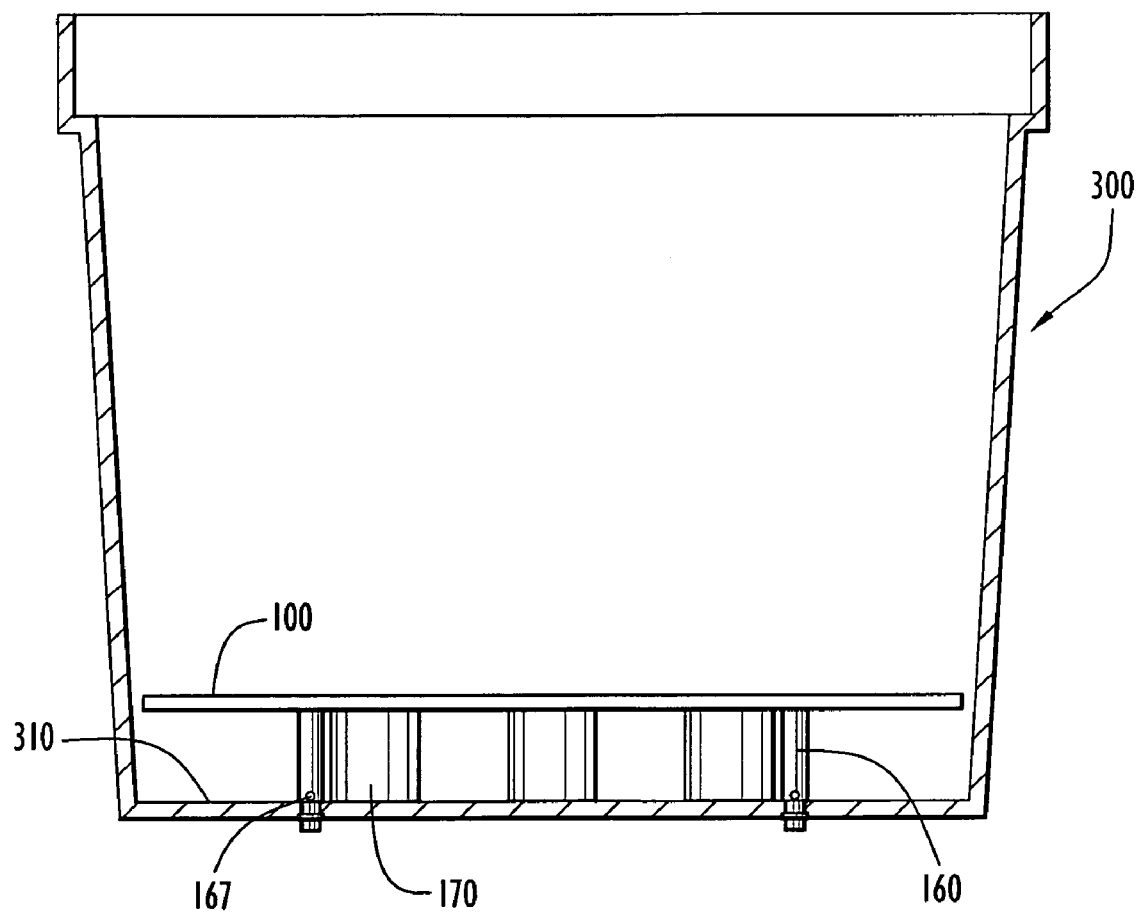
FIG. 8 illustrates a cross sectional view of a container including the plant supporting device of FIGS. 7A and 7B.

FIGS. 7 and 8 illustrate another embodiment of the base 100 according to an embodiment of the invention. As shown, the base 100 includes a generally circular, plate-shaped structure similar to that described with regard to FIGS. 1 and 2. Referring to FIGS. 7A and 7B, the base connectors 160 are now hollow, including a channel in communication with both the base apertures 140, as well as an exit portal 167 disposed along the bottom of the connectors 160. This configuration permits fluid to flow from the top surface 110 of the base, down through the bottom surface 120, and out the drainage hole 340 of the container 300 via the exit portal 167.

The receptacles formed in the base 100, moreover, may include a plurality of under-mounted cups 170 extending downward from the bottom surface 120 of the base. The under-mounted cups 170 are dimensioned similarly to the previously described receptacles, and thus are dimensioned to receive the supporting post 200. Specifically, each under-mounted cup 170 may be substantially cylindrical and include a closed distal (lower) end and an open proximal (upper) end. A substantially cylindrical channel 172, extending from the cup closed distal end to the cup open proximal end, is defined within the cup 170. The channel 172 includes dimensions sufficient to receive the supporting post 200. The axial length of the under-mounted cups 170 is not particularly limited. Preferably, the axial length of the cups 170 may be selected to be less than the axial length of the connectors 190 by at least the thickness of the floor 310 of the container 300 to enable the connectors to extend through the drainage holes 340. In other words, the under-mounted cups 170 typically have a height shorter than that of the connectors 160 to permit the connectors to extend through the drainage holes 340 of the container 300, as well as to enable the cups 170 to serve as spacers or feet, resting on the container floor 310 and supporting the base 100 above the floor 310.

The operation of the connectors is illustrated with reference with FIG. 8. Briefly, the connectors 160 are aligned with corresponding drainage holes 340 and are axially urged through the holes to position the floor 310 of the container 300 within the annular recess 165. As shown, the axially spaced annular shoulders defining the recess 165 engage the lip of the drainage hole 340. This prevents inadvertent vertical movement and/or disengagement of the connector 160 from the drainage holes 340. To disconnect the base 100 from the container 300, sufficient force is applied to axially remove the connectors 160 from the drainage holes 340. In this manner, the presence of the drainage holes 340 permit the base 100 to be removably coupled to the floor 310 of the container 300.

Figure 9A:
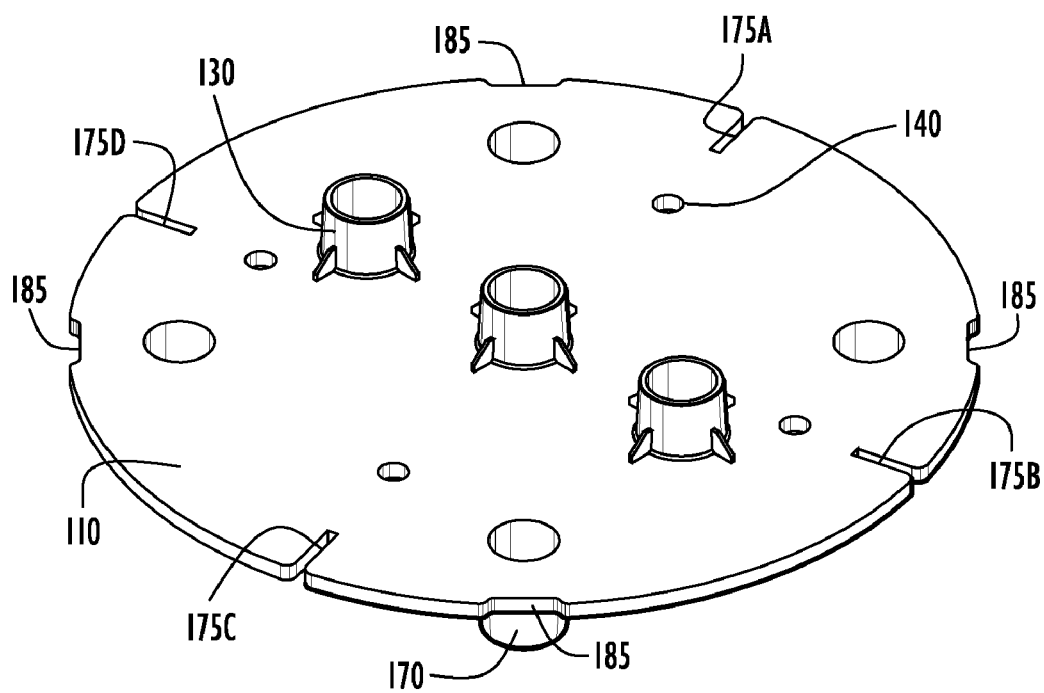
FIGS. 9A and 9B illustrate top and bottom perspective views, respectively, of a plant supporting device according to another embodiment of the invention.
Figure 9B:
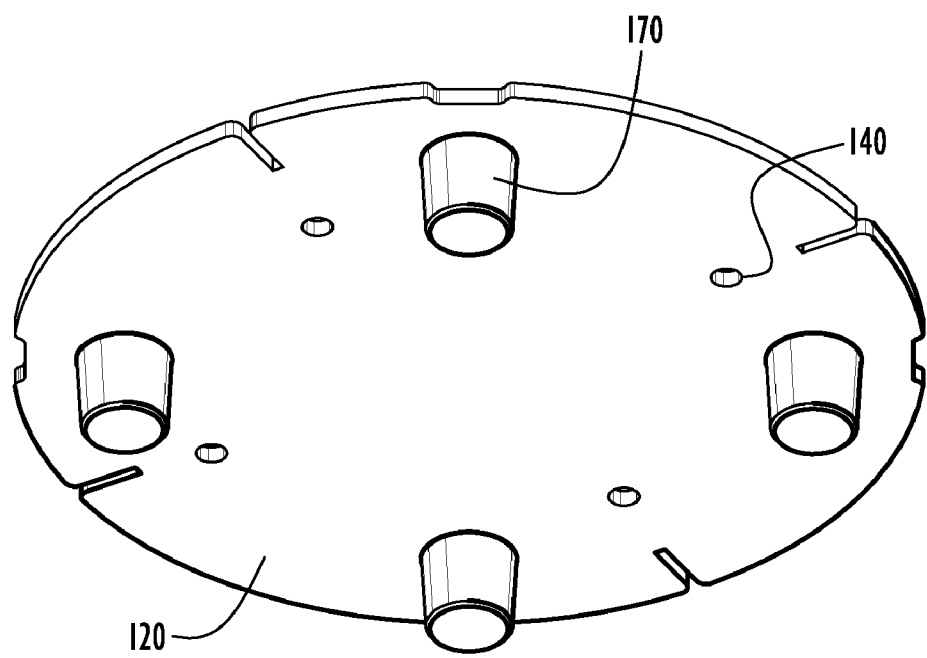

FIGS. 9A and 9B illustrate top and bottom perspective views, respectively, of a base 100 according to another embodiment of the invention. As shown, the base 100 includes a generally circular plate with a top surface 110 and a bottom surface 120. A plurality of upstanding cups 130, similar to those described above with reference to FIGS. 1A and 1B, extends upward from the top surface 110. The cups are generally aligned and are located proximate the center of the base 100. In addition, the base 100 also includes a plurality of under-mounted cups 170 similar to those described with reference to FIG. 8. The under-mounted cups 170 are equidistant, being angularly spaced proximate the base's periphery. The under-mounted cups 170, configured to receive a supporting post 200, further serve as spacers or feet, supporting the base 100 above the floor 310 of the container 300, permitting the flow of fluid (e.g., air) below the base 100.

Figure 9C:
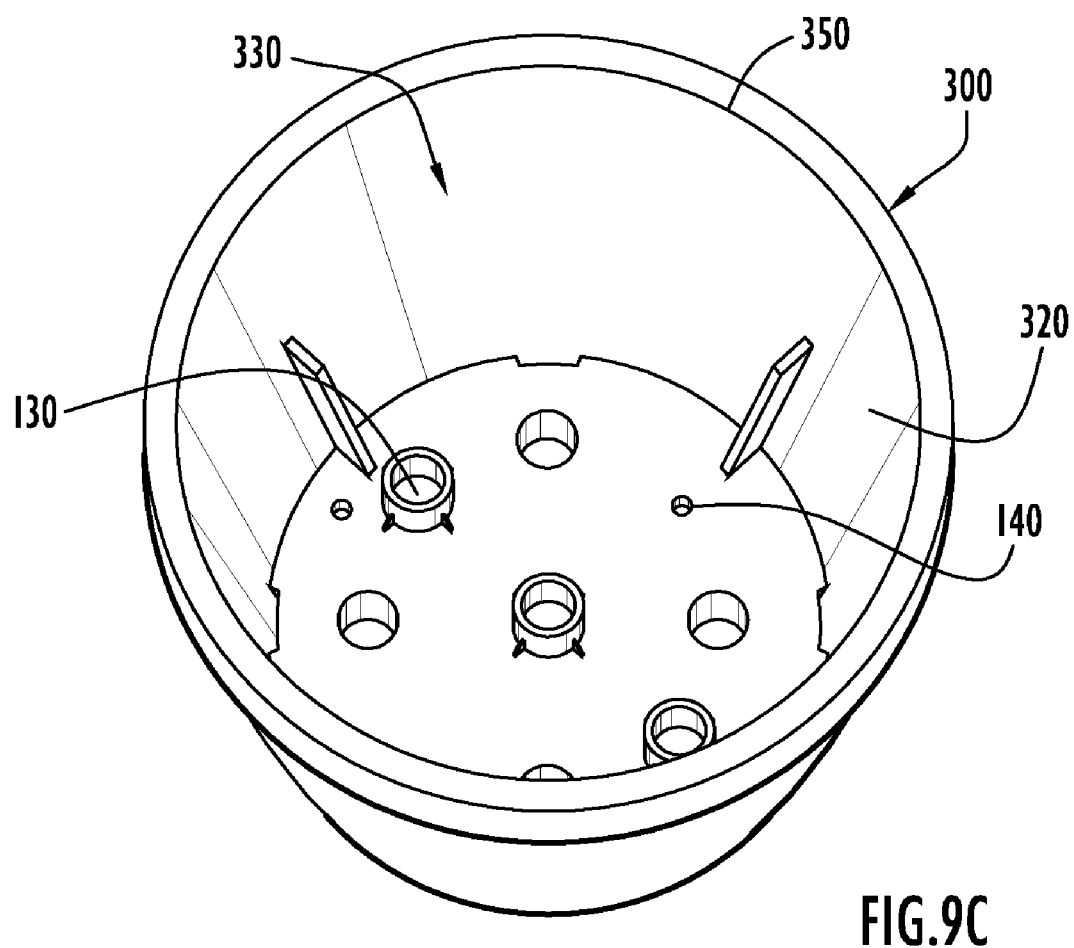
FIG. 9C illustrates a perspective view of a container including the plant supporting device of FIG. 9A.

The base 100 may further include a plurality of slots configured to mate with ribs on the side wall 320 of the container. Briefly, containers 300 such as flowerpots and planters may include a series of ribs (not illustrated) extending radially inward from the inside surface of the side wall 320. The ribs may extend the length of the side wall, or may be localized in and area adjacent the floor 310. By way of example, a circular container 300 may include four ribs extending the height of the container, angularly spaced apart by approximately 90°. Alternatively, two ribs may be present at 180° spaced locations. Each rib may have a height of one-quarter to one-half of an inch. To accommodate for these ribs, the base 100 may be provided with four through slots 175 cut inward from its perimeter and sized to slidably receive the ribs extending from the container side wall 320. In the embodiment illustrated in FIGS. 9A and 9B, four slots 175A, 175B, 175C, and 175D are positioned about the perimeter of a circular base 100, spaced 90° apart about the perimeter. With this configuration, when the base 100 is positioned within the container 300 (seen in FIG. 9C) such that each slot 175A-D engages its corresponding rib, the rotation of the base 100 about its central axis is prevented. Furthermore, as explained above, since the diameter of the base 100 is chosen so that the base circumference is close to the container side wall 320, the base 100 is also restrained from inadvertent transverse movement in the container 300. As a result, a secure, yet removable connection between the base 100 and the container 300 is created.

The base 100 further comprises a plurality of indentations 185 at angularly spaced locations defined in the base's periphery.

Figure 11:
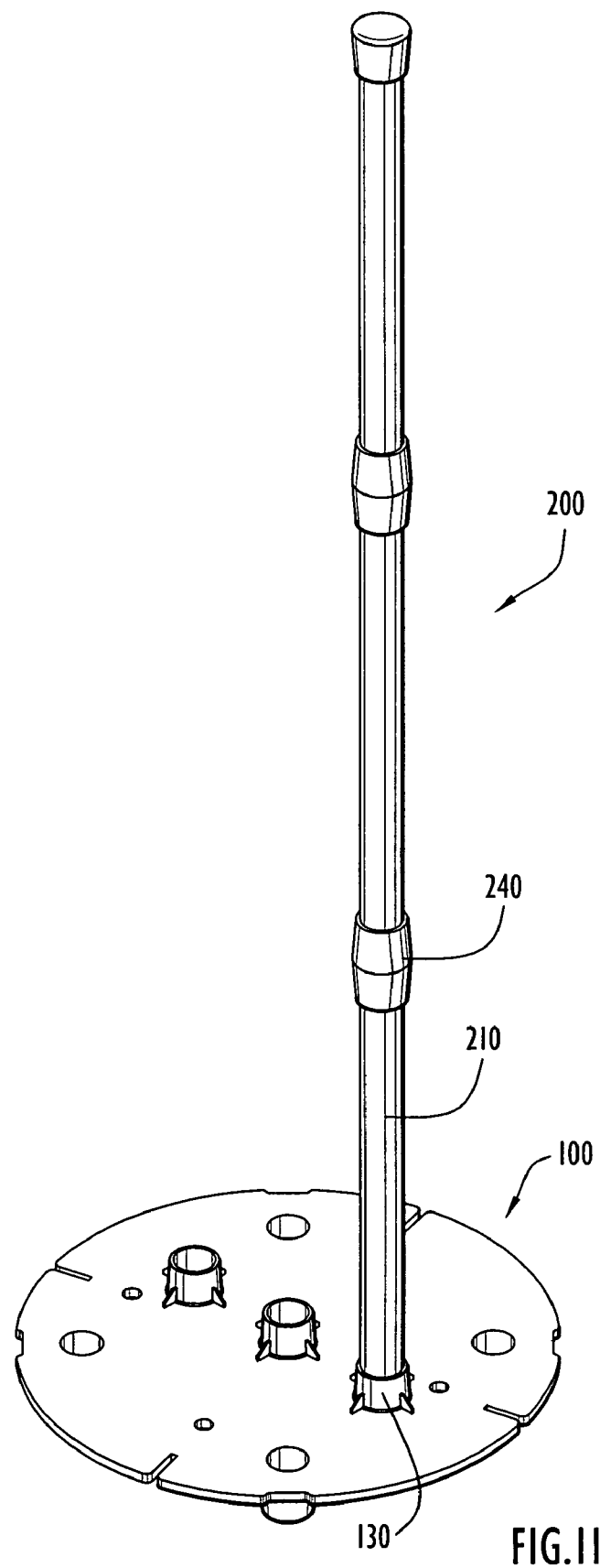

The post 200 for supporting vegetation such as a plant or flower according to the present invention is illustrated in FIGS. 10 and 11. The post 200 may include a pole or shaft 210 with a distal (lower) end 220 and a proximal (upper) end 230. The shaft 210 may include a substantially cylindrical body contoured for compatibility with the interior of the receptacle (e.g., an upstanding cup 130, a recess 150, or an under-mounted cup 170). The shaft 210 may further be formed into a solid rod, or may comprise a channel defined therein (not illustrated). The post 200 may include and suitable dimensions and shapes, and may be formed from any suitable materials. By way of example, the supporting post 200 may be formed from, but is not limited to, plastic, wood, and metal. In a preferred embodiment, the supporting post 200 comprises plastic.

The height of the supporting post 200 may be adjustable. Referring to FIG. 10, the supporting post 200 may be formed from a plurality of connected shafts. Specifically, the supporting post 200 may include a first shaft 210A coupled to a second shaft 210B via a first axial connector 240A, and a third shaft 210C coupled to the second shaft 210B via a second axial connector 240B. The connector 240A, 240B may comprise an annular member configured to receive the proximal end 230 of one shaft 210 and the distal end 220 of an adjoining shaft 210. This creates a reconfigurable post 200 with a height that is adjustable by adding or removing shafts 210 as desired. With this configuration, as a plant or flower grows, it will eventually obtain a height taller than the original support post 200. Simply adding sections to the post 200 modifies its height and provides a support for the plant/flower.

Figure 12:
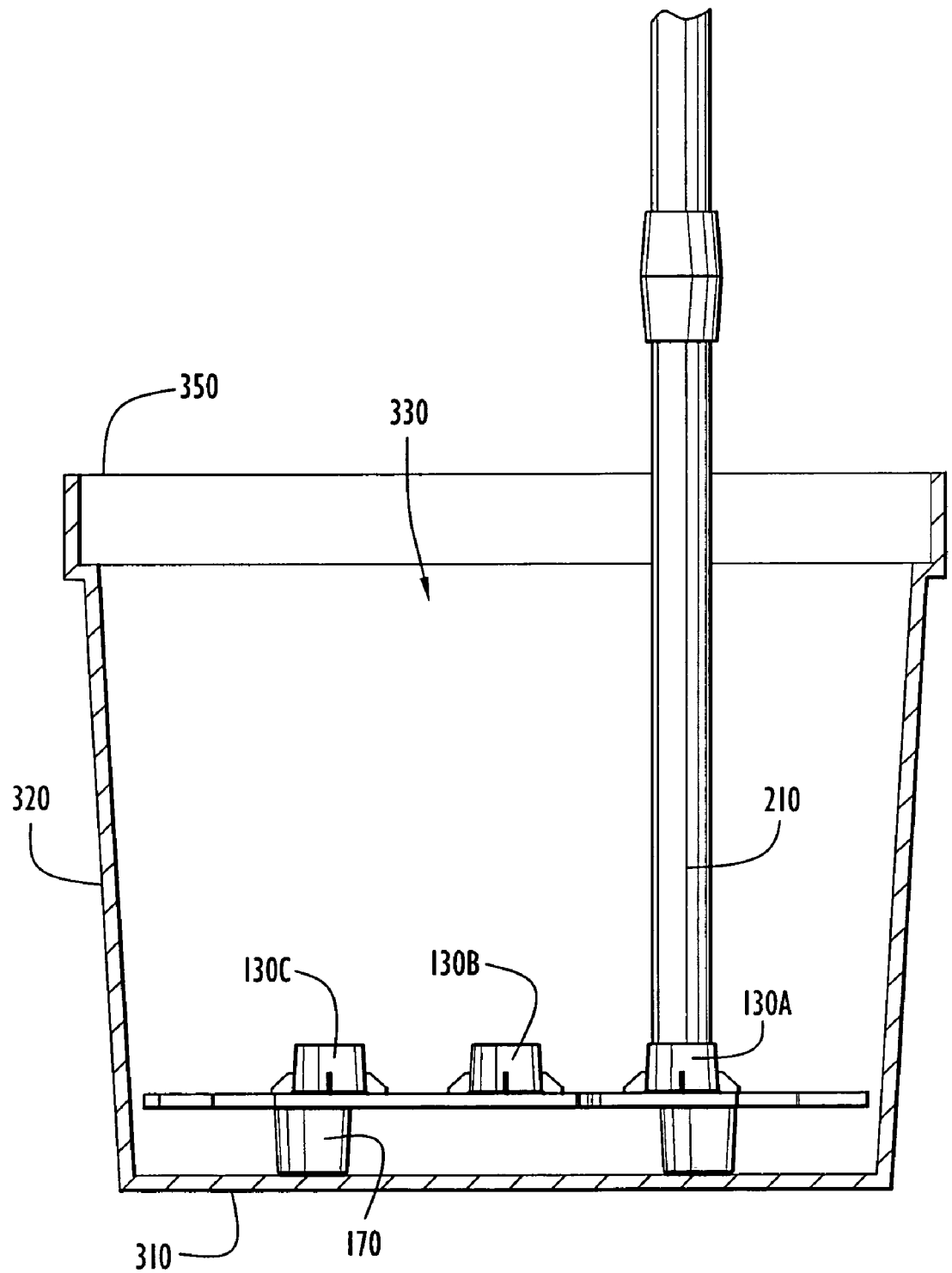
FIG. 12 illustrates a cross sectional view of a container including the plant supporting device of FIGS. 10 and 11.

The operation of the support device is explained with reference to FIGS. 11 and 12. As discussed above, the container 300 may include an opened-top structure including a floor 310 and a side wall 320 defining a channel 330 extending from the floor 310 to the opening 350. Initially, the base 100 is inserted into the container 300. If ribs are present within the container 300 (described above), the base 100 is first aligned such that one or more of the slots 175A, 175B, 175C, 175D mates with the ribs. In addition, if depending connectors 160 are provided, the connectors are urged through the drainage holes 340. Once inserted, the under-mounted cups 170 engage the floor 310, positioning the base 100 above the floor. The receptacles, moreover, are oriented in a generally upright position. The supporting post 200 may then be aligned with a desired receptacle 130A, 130B, 130C, and 170 (in FIG. 12, the shaft 210 is aligned with cup 130A), with the distal end 220 of the shaft 210 being inserted therein. If the supporting post 200 includes additional sections, they may be coupled using the connector 240 as described above. Alternatively, the sections may be added gradually as the height of the plant/flower increases over time. Once connected, the supporting post 200 is oriented in a generally vertical position, extending upward from the base and terminating beyond the opening 350 of the container 300. Material (e.g., potting soil) may then fill the container 300, and the desired vegetation (plant, flower, seeds, etc.) may be planted. Preferably, the vegetation is positioned proximate the supporting post such that, as the plant or flower grows, it may be easily supported by the post utilizing straps (e.g., flexible material such as cotton, twine, etc), ties, plant tape, ribbons, tomato clips, etc.

Figure 13A:
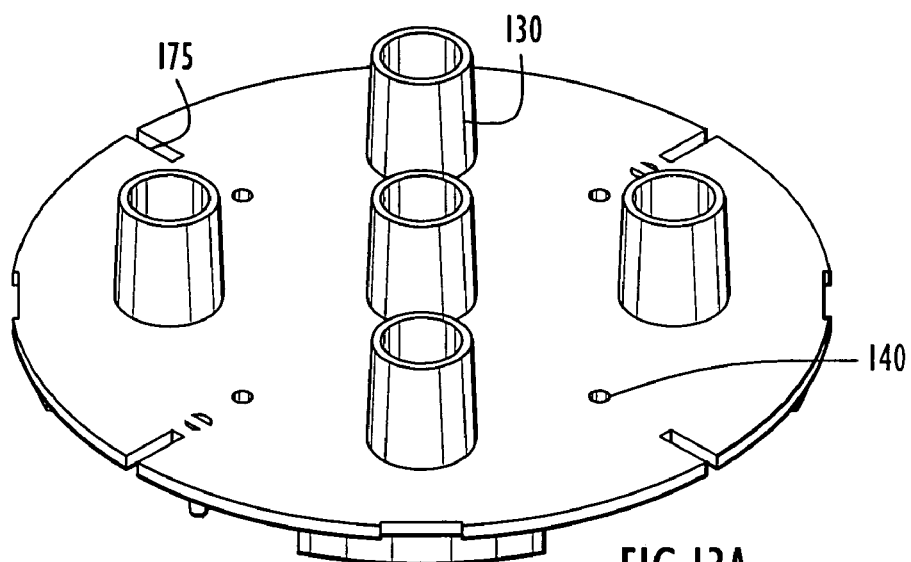
FIGS. 13A, 13B, and 13C illustrate top, bottom, and side perspective views, respectively, of a plant supporting device according to another embodiment of the invention.
Figure 13B:
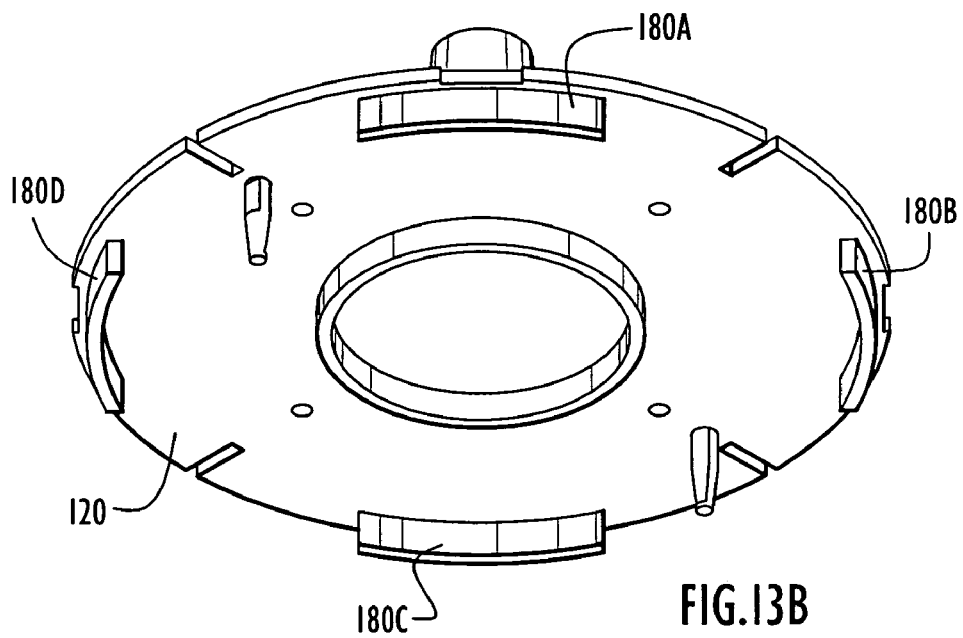
Figure 13C:
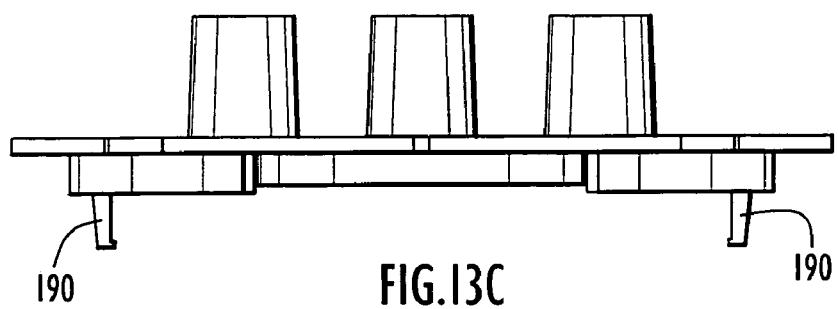

Referring to FIGS. 13A, 13B, and 13C, another embodiment of the base 100 according to the present invention takes the form of a circular disc similar to that described above in FIGS. 9A and 9AB. The under-mounted cups 170 have been omitted, and a plurality of upstanding cups 130 (five in the embodiment of FIGS. 13A-C) are disposed on the top surface 110 of the base 100. The base 100 further includes a series of spacers or tabs 180 that depend from the bottom surface 120 at angularly spaced locations about the base periphery. Specifically, the bottom surface 120 of the base 100 includes a first tab 180A (located at the 12 o'clock position), a second tab 180B (at the 3 o'clock position), a third tab 180C (at the 6 o'clock position), and a fourth tab 180D (at the 9 o'clock position). The first tab 180A is generally positioned such that it diametrically opposes third tab 180C and, similarly, second tab 180B diametrically opposing fourth tab 180D. The tabs 180 may be curved to correlate with the curve of the base 100. The tabs 180 are adapted to engage the floor 310 of the container 300, supporting the base 100 thereover. This, in turn, allows fluid flow, providing for drainage through the drainage holes 340, as well for as aeration of the soil.

The bottom surface 120 of the base 100 may be further provided with a plurality of depending spring clip members 190 disposed at locations configured to align with the drainage holes 340 formed in the container 300. The number of spring clips 190 present is not particularly limited. In the embodiment illustrated in FIGS. 13A-C, two spring clips 190 are disposed at 180°-spaced locations. Preferably, the spring clips 190 are aligned with the drainage holes 340 in the container 300. The clips 190 extend distally from the bottom surface 120 of the base 100, and may include inward-facing latching tips 195 at their distal ends, which are spaced from one another by slightly less than the spacing between the two receiving drainage holes 340 in the container. The clips 190 are configured to resiliently flex outward as they pass through a drainage hole 340 and then snap back to latch against the bottom surface of the container floor 310. Similar to the fasteners described above (e.g., adhesives, the connectors 160, etc.) the spring clips 190 prevent inadvertent vertical movement of the base 100 relative to the container, while permitting selective removal of the base by simply flexing the clips 190 outward from the floor 310 of the container 300 and lifting the base 100 out of the channel 330. The axial length of the tabs 180 may be selected to be less than the axial length of the clips 190 by at least the thickness of the floor 310 of the container 300 to enable the clips to extend through the container drainage holes 340 sufficiently to latch the base 100 in place as described above. The dimensions of the clips 190 are not particularly limited. Preferably, the thickness of the clips 190 is selected to prevent complete blockage of the drainage holes 340 in which they are inserted (so that the drainage function of the holes will not be significantly impaired).

Figure 14:
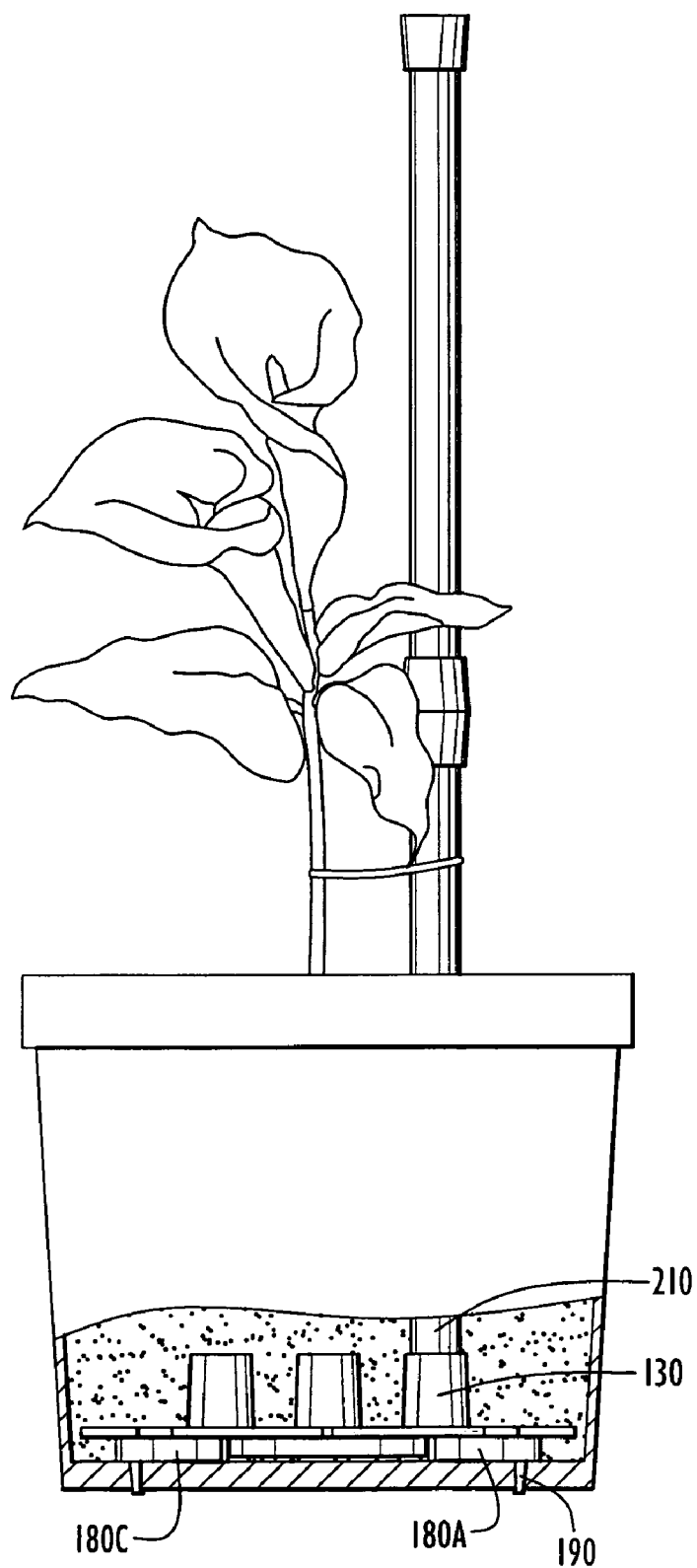
FIG. 14 illustrates a cross sectional view of a container including the plant supporting device of FIGS. 13A-13C.

The operation of the embodiment of FIGS. 13A-13C is explained with reference to FIG. 14. Initially, the base 100 is placed in the bottom of a container such as a flowerpot or planter. Slots 175 aligned with ribs on container (if present) and the spring clips 190 are aligned with drainage holes 340. Once aligned, the clips 190 are urged axially into the drainage holes 340, securing the base 100 to the container 300. The distal 220 of the supporting post 200 may then be inserted into the desired receptacle 130, 150, 170 such that the pole is supported in a generally vertical orientation. Potting soil is filled into the container 300, and the desired plant and/or flower is planted. As the plant and/or flower grows, it may be selectively coupled to the supporting post 200 using connection straps as described above.

In any of the above described embodiments, should the plant and/or flower require transfer from is original container to another, differently sized (e.g. larger) container, the transfer may be performed without disrupting the soil of the plant or flower. This, in turn, prevents damage to the roots of the plant and/or flower. To transfer the plant and/or flower, the base 100 and plant may be axially removed from the container as 300 a single unit. The roots, located in the soil sandwiched between the flower and the base 100, remains undisturbed as they are is placed in a new (larger) container. The spring clips 190 may then be aligned with the drainage holes 340 of the new container and the base connected thereto via the drainage holes 340. Additional soil may further be added, if necessary.

While the invention has been described in detail and with reference to specific embodiments thereof, it will be apparent to one skilled in the art that various changes and modifications can be made therein without departing from the spirit and scope thereof. For example, the support device may be used to support any number of plants and/or flowers. The base 100 may include any shape and have any dimensions suitable for its described purpose. The base 100, moreover, may be formed from any suitable materials. The base 100, rather than being a separate part that is inserted into a separate container 300, may be formed as an integral part of the container 300. It should be noted that the slotted base 100 will readily fit into containers 300 lacking the rib structures of the type of the type described above. The apertures 140 may include any suitable dimensions, and may be placed at suitable locations on the base 100.

The receptacles 130, 150, 170 may include any shape and dimensions suitable for their described function. The number and/or location of the receptacles is not limited. That is, the base 100 may include any number and/or combination of upstanding cups, under-mounted cups, and/or recesses. For example, the base may include one each of an upstanding cup 130, a recess 150, and an under-mounted cup 170. In addition, each receptacle on a base may include the similar dimensions (to receive supporting posts of similar diameters), or may include different dimensions (to enable the base to receive supporting posts of varying diameters). The receptacles may further include an interior guide element extending from closed receptacle end to opened receptacle end. The guide elements may be adapted to be received by a channel formed within the supporting post to guide the post toward receptacle closed end.

Any number of supporting posts 200 may be provided up to the amount of receptacles present in the base 100. The supporting post 200 can be of any suitable dimensions and be formed from any suitable material. The sections of the supporting posts 200 may be of any size and shape suitable for its described function. In addition, individual shanks 210 forming the supporting post 200 may have the same or different sizes. Preferably, the supporting post 200 is connected to a receptacle via friction fit; however, any means of securing the supporting post to the receptacle can be employed including, but not limited to, threaded engagement, detent snap fits, rotational locking, etc. The supporting post 200, in addition to supporting plant may also support accessory items. For example, a light source may be connected to the post such that light may be directed toward the plant. This helps indoor growing of plants. Alternatively, other accessories (water cans, bird feeders, anti bird devices, etc.) may be coupled to the supporting post.

The container 300 may include any size and shape suitable for its described function, and may comprise any suitable materials. Drainage holes 340 may or may not be present in the container 300. When present, the drainage holes may include any suitable dimensions, and may be placed at suitable locations on the container floor 310.

It is to be understood that the terms "top", "bottom", "front", "rear", "side", "height", "length", "width", "upper", "lower", "vertical" and the like are used herein merely to describe points of reference and do not limit the present invention to any particular orientation or configuration. Thus, it is intended that the present invention covers the modifications and variations of this invention that come within the scope of the appended claims and their equivalents.

I claim:

1. A plant support system for use with a plant container including a bottom wall and a side wall extending upwardly from the bottom wall, the support system comprising:
    a supporting post including a first end and a second end, wherein the post is capable of supporting plants of various heights; and
    a base plate configured to insert into the container and to rest above the bottom wall, the base plate comprising:
        a top surface and a bottom surface,
        at least one drain aperture, extending through the base plate from the top surface to the bottom surface, operable to permit the flow of fluid therethrough,
        a plurality of upstanding receptacles extending above said top surface, each upstanding receptacle having an open upper end spaced from and above said top surface and a closed lower end at said top surface, each upstanding receptacle being adapted to removably receive and support said first end of the supporting post at the upstanding receptacle closed lower end to secure the post in a generally upright position,
        a second plurality of recessed receptacles extending below said bottom surface, each recessed receptacle having an open upper end at said top surface and a closed lower end spaced from and below said bottom surface, each recessed receptacle being adapted to removably receive and support said first end of the supporting post at the recessed receptacle closed lower end to secure the post in a generally upright position;
        a plurality of angularly spaced slots extending radially inward from the periphery of the plate; and
        wherein the plurality of slots is configured to engage a plurality of angularly spaced ribs extending inwardly from the side wall of the plant container, prohibiting the rotation of the base plate about its axis.

2. The plant support system of claim 1 further comprising:
    a container having:
        a bottom wall and a side wall extending upward from the bottom wall to define a cavity, and
        a plurality of angularly spaced ribs extending inward from the side wall of the container, wherein:
            the bottom wall of the container is circular and the side wall of the container is generally frusto-conical,
            the base plate is circular, and
            the slots extend radially inward from the periphery of the base plate.

3. The plant support system of claim 1 further comprising a container having a bottom wall and a side wall extending upward from the bottom wall to define a cavity, and
    a plurality of angularly spaced ribs extending inward from the side wall of the container, wherein the ribs are respectively received by the plurality of angularly spaced slots on the base plate.

4. The plant support system of claim 1 wherein said closed lower ends of said recessed receptacles support the base plate on the bottom wall of the container with said bottom surface spaced from the bottom wall.

5. A support system for use with a plant container including a generally circular bottom wall and a generally frusto-conical side wall extending upwardly from the bottom wall, the support system comprising:
    a supporting post including a first end and a second end for supporting plants of various heights; and
    a base plate adapted to rest above the bottom wall comprising:
        a top surface and a bottom surface;
        at least one drain aperture extending through the base plate from the top surface to the bottom surface to permit flow of fluid therethrough;
        a plurality of receptacles each adapted to receive in removable friction fit engagement an end portion of the supporting post and to secure the post in a generally upright position;
        a plurality of short slots defined therethrough extending radially inward from the periphery of the base plate at respective first angularly spaced locations, wherein the slots are operable to receive and engage respective ribs extending inward from the container wall;
        a plurality of indentations defined in the periphery of the base plate at second angularly spaced locations alternating between said first angularly spaced locations, said indentations having a different shape than the shape of the slots;

wherein the receptacles comprise first cups having a closed end at said top surface and an open upper end extending upward from said top surface, and second cups having an open upper end at said top surface and a closed bottom end extending downward from and below the bottom surface, wherein said closed bottom ends of said second cups support the base plate on the bottom wall of the container with said bottom surface spaced from the bottom wall.

6. The plant support system of claim 5 wherein said supporting post is a first supporting post having a cross-section of a first configuration, and further comprising a second supporting post having a cross-section of a second larger configuration, and wherein the plurality of receptacles includes at least one first receptacle dimensioned to receive and support the first end of the first supporting post in friction fit engagement and in a generally upright position, and a second receptacle dimensioned to receive and support the first end of the second supporting post in friction fit engagement in a generally upright position.

7. The plant support system of claim 6 wherein said cross-section of a first configuration is circular, and wherein said at least one first receptacle is a generally cylindrical cup.

8. The plant support system of claim 5, wherein the receptacles comprise first cups extending upward from the top surface of the base plate and second cups extending downward from the top surface through and below the bottom surface of the base plate, wherein said second cups support the base plate on the bottom wall of the container with said bottom surface spaced from the bottom wall.

9. The plant support system of claim 5 further comprising a container having a bottom wall, a side wall extending upward from the bottom wall, wherein the side wall includes a plurality of angularly spaced ribs configured to engage the slots on the base plate.

10. The plant support system of claim 5 wherein said indentations are angularly wider and radially smaller than said slots.

11. A plant support system for use with a plant container including a bottom wall and a side wall extending upwardly from the bottom wall, the support system comprising:

a supporting post including a first end and a second end, wherein the post is capable of supporting plants of various heights; and a base plate configured to insert into the container and to rest above the bottom wall, the base plate comprising:
a top surface and a bottom surface,
at least one drain aperture, extending through the base plate from the top surface to the bottom surface, operable to permit the flow of fluid therethrough,
a plurality of upstanding receptacles extending above said top surface, each upstanding receptacle having an open upper end spaced from and above said top surface and a closed lower end at said top surface, each upstanding receptacle being adapted to removably receive and support said first end of the supporting post to secure the post in a generally upright position, and
a plurality of recessed receptacles extending below said bottom surface, each recessed receptacle having an open upper end at said top surface and a closed lower end spaced from and below said bottom surface, each recessed receptacle being adapted to removably receive and support said first end of the supporting post to secure the post in a generally upright position.

12. The plant support system of claim 11 wherein said upstanding and recessed receptacles have cup-shaped configurations, and wherein said closed lower ends of said recessed receptacles support the base plate on the bottom wall of the container with said bottom surface spaced from the bottom wall.

13. The plant support system of claim 11 wherein said supporting post is a first supporting post having a cross-section of a first configuration, and further comprising a second supporting post having first and second ends and a cross-section of a second larger cross-section, and wherein the receptacles include at least one first receptacle dimensioned to receive and support the first end of the first supporting post in friction fit engagement and in a generally upright position, and a second receptacle dimensioned to receive and support the first end of the second supporting post in friction fit engagement in a generally upright position.

14. The plant support system of claim 13 wherein said cross-section of a first configuration is circular, and wherein said at least one first receptacle is a generally cylindrical cup.

* * * * *